United States Patent
Masuda et al.

(10) Patent No.: US 8,659,840 B2
(45) Date of Patent: Feb. 25, 2014

(54) OPTICAL ELEMENT, DISPLAY APPARATUS, DISPLAY METHOD, AND MOVING BODY

(75) Inventors: Lisa Masuda, Kanagawa-ken (JP); Shigeru Shimakawa, Kanagawa-ken (JP); Naotada Okada, Kanagawa-ken (JP); Kazuo Horiuchi, Kanagawa-ken (JP); Haruhiko Okumura, Kanagawa-ken (JP); Takashi Sasaki, Kanagawa-ken (JP); Hiromi Suzuki, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 408 days.

(21) Appl. No.: 13/011,348

(22) Filed: Jan. 21, 2011

(65) Prior Publication Data
US 2011/0228403 A1    Sep. 22, 2011

(30) Foreign Application Priority Data
Mar. 17, 2010 (JP) ................. 2010-060209

(51) Int. Cl.
*G02B 3/08* (2006.01)
(52) U.S. Cl.
USPC ............................ 359/742; 359/741; 359/743
(58) Field of Classification Search
USPC .......................................... 359/678, 741–743
See application file for complete search history.

(56) References Cited

U.S. PATENT DOCUMENTS

| | | | |
|---|---|---|---|
| 4,775,229 A | 10/1988 | Ichihara et al. | |
| 4,787,722 A | 11/1988 | Claytor | |
| 4,904,069 A * | 2/1990 | Nakata | 359/742 |
| 6,236,511 B1 | 5/2001 | Brown | |

FOREIGN PATENT DOCUMENTS

| | | |
|---|---|---|
| JP | 1-147421 | 6/1989 |
| JP | 1-147422 | 6/1989 |
| JP | 2-120785 | 5/1990 |
| JP | 10-62870 | 3/1998 |
| JP | 11-271665 | 10/1999 |
| JP | 2000-168352 | 6/2000 |
| JP | 2000-171613 A | 6/2000 |
| JP | 2000-249965 | 9/2000 |
| JP | 2001-13451 | 1/2001 |
| JP | 2002-287077 | 10/2002 |
| JP | 2002-311425 | 10/2002 |
| JP | 2004-177920 | 6/2004 |
| JP | 2008-257009 | 10/2008 |
| JP | 2010-78860 | 4/2010 |

OTHER PUBLICATIONS

Partial European Search Report issued Nov. 15, 2011, in Patent Application No. 11153328.7.
Office Action issued Jan. 13, 2012 in Korea Application No. 10-2011-0008910 (With English Translation).
Japanese Office Action issued Feb. 8, 2013 in Patent Application No. 2011-284523 with English Translation.

(Continued)

*Primary Examiner* — Evelyn A. Lester
(74) *Attorney, Agent, or Firm* — Oblon, Spivak, McClelland, Maier & Neustadt, L.L.P.

(57) ABSTRACT

According to one embodiment, an optical element includes a first optical sheet having a first major surface. The first optical sheet includes a first Fresnel lens provided in the first major surface. An optical axis of the first Fresnel lens at the first major surface is disposed at a position different from a position of a center of an outline of the first major surface.

1 Claim, 12 Drawing Sheets

(56) References Cited

OTHER PUBLICATIONS

Extended European Search Report issued Mar. 5, 2012, in European Patent Application No. 11153328.7.

Chinese Office Action issued Feb. 27, 2013 in Patent Application No. 201110049591.8 with English Translation.

Japanese Office Action issued Nov. 11, 2011, in Patent Application No. 2010-060209 (with English-language translation).

* cited by examiner

OPTICAL ELEMENT, DISPLAY APPARATUS, DISPLAY METHOD, AND MOVING BODY

CROSS-REFERENCE TO RELATED APPLICATIONS

This application is based upon and claims the benefit of priority from the prior Japanese Patent Application No. 2010-060209, filed on Mar. 17, 2010; the entire contents of which are incorporated herein by reference.

FIELD

Embodiments described herein relate generally to an optical element, a display apparatus, a display method, and a moving body.

BACKGROUND

Head-up displays (HUDs) that allow an operator to view image information and an image of the scenery of the external environment by displaying various image information on a windshield of a moving body such as a vehicle, aircraft, etc., are known. For example, JP-A 11-271665 (Kokai) (1999) discusses technology regarding a head-up display that uses a liquid crystal display device.

In such HUDs, improvement of the ease of viewing while downsizing of apparatuses is necessary.

DETAILED DESCRIPTION

Figure 1A:
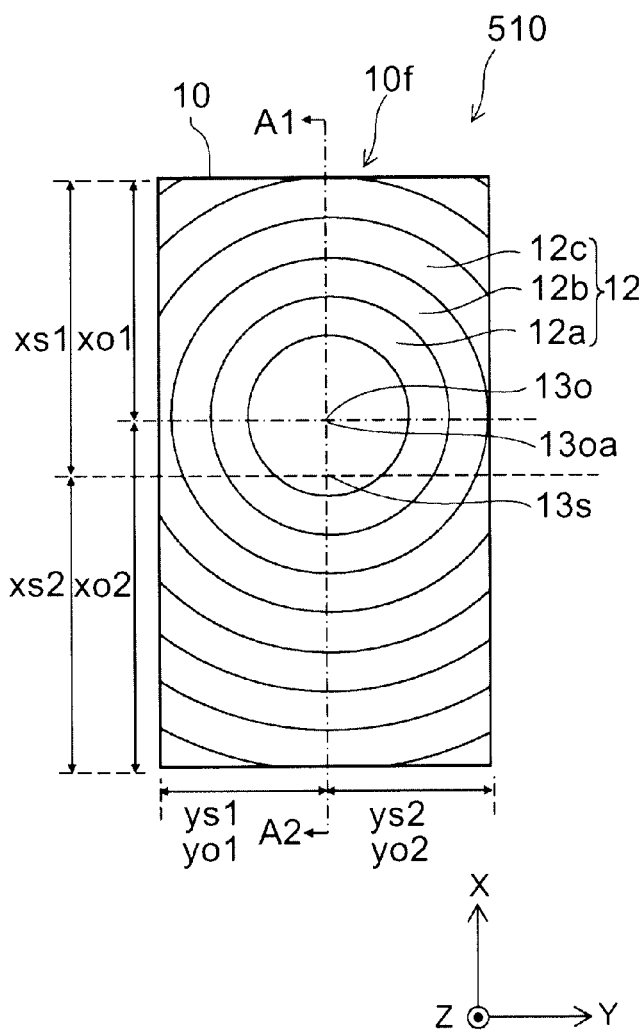
FIGS. 1A and 1B are schematic views illustrating the configuration of an optical element according to a first embodiment.

In general, according to one embodiment, an optical element includes a first optical sheet having a first major surface. The first optical sheet includes a first Fresnel lens provided in the first major surface. An optical axis of the first Fresnel lens at the first major surface is disposed at a position different from a position of a center of an outline of the first major surface.

Embodiments of the invention will now be described in detail with reference to the drawings.

The drawings are schematic or conceptual; and the relationships between the thicknesses and widths of portions, the proportions of sizes among portions, etc., are not necessarily the same as the actual values thereof. Further, the dimensions and the proportions may be illustrated differently among the drawings, even for identical portions.

In the specification and the drawings of the application, components similar to those described in regard to a drawing thereinabove are marked with like reference numerals, and a detailed description is omitted as appropriate.

First Embodiment

A first embodiment of the invention is an optical element used in a display apparatus such as a HUD. The display apparatus can be used as a HUD mounted in moving bodies such as vehicles, ships, aircraft, etc. However, the embodiments of the invention are not limited thereto. The display apparatus may be applied in simulators such as driving simulators, flight simulators, etc., and in amusement applications such as games. Hereinbelow, the case where the optical element according to this embodiment is applied in a display apparatus of a HUD for a vehicle is described as an example.

Figure 1B:
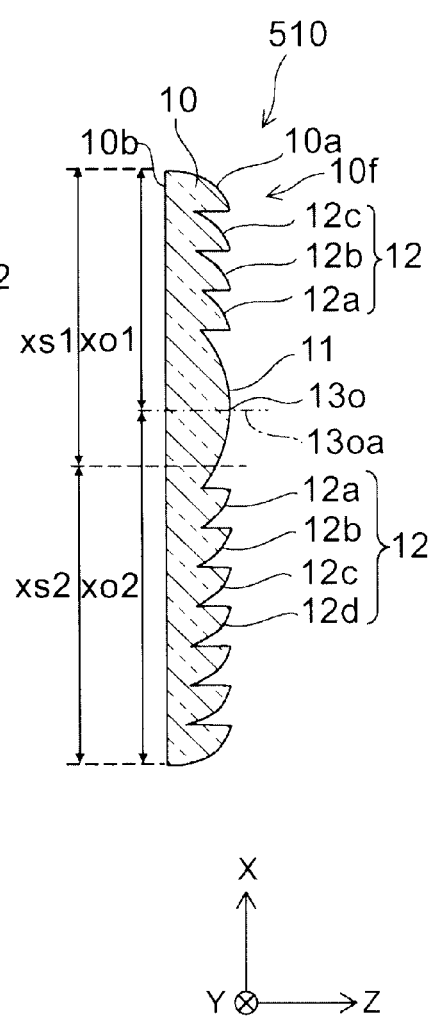

FIGS. 1A and 1B are schematic views illustrating the configuration of the optical element according to the first embodiment of the invention.

Namely, FIG. 1A is a plan view; and FIG. 1B is a cross-sectional view along line A1-A2 of FIG. 1A.

Figure 2:
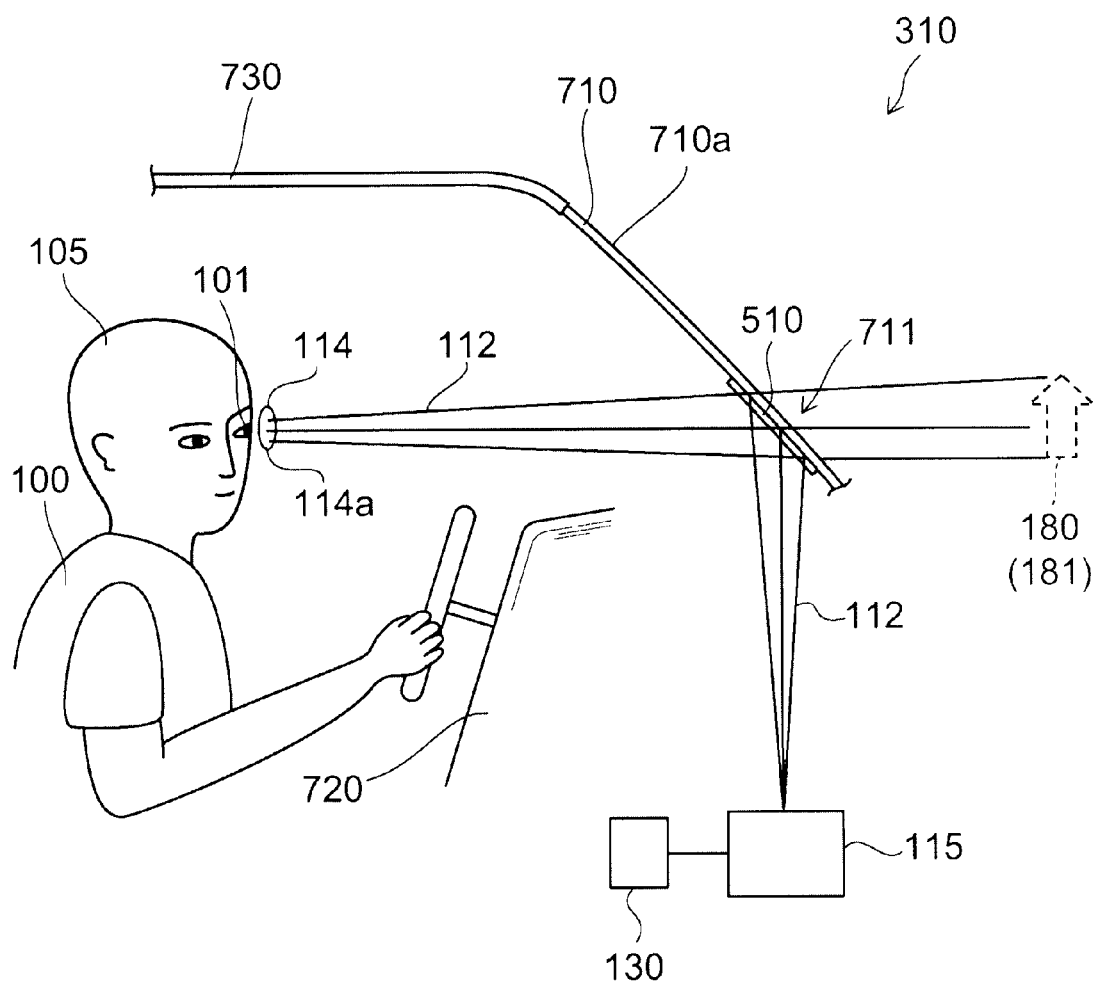
FIG. 2 is a schematic view illustrating a state of use of a display apparatus in which the optical element according to the first embodiment is used.

FIG. 2 is a schematic view illustrating a state of use of a display apparatus in which the optical element according to the first embodiment of the invention is used.

First, an overview of the configuration of the display apparatus 310 according to this embodiment will be described using FIG. 2.

As illustrated in FIG. 2, the display apparatus 310 according to this embodiment is mounted in a vehicle 730 (a moving body). The display apparatus 310 includes an image projection unit 115. The display apparatus 310 also may include an image data generation unit 130.

The image data generation unit 130 generates image data.

The image projection unit 115 projects a light flux 112 including an image based on the image data generated by the image data generation unit 130 toward a human viewer 100 riding in the vehicle 730 by using a windshield unit 710 of the vehicle 730 to reflect the light flux 112.

The windshield unit 710 includes a windshield 710a of the vehicle 730. The windshield unit 710 includes, for example, a reflecting unit 711 provided in the windshield 710a of the vehicle 730.

An optical element 510 according to this embodiment may be used as the reflecting unit 711. The optical element 510 may be adhered to, for example, the indoor side of the windshield 710a. As described below, the optical element 510 may be built into the windshield 710a. Further, the optical element 510 may be disposed proximally to the windshield 710a on the indoor side of the windshield 710a apart from the windshield 710a. In the case where the optical element 510 is disposed apart from the windshield 710a, a member supporting the optical element 510 also may be included in the windshield unit 710.

Thus, the vehicle 730 (the moving body) includes the optical element 510 according to this embodiment of the invention and a transparent plate (the windshield 710a and the windshield unit 710) supporting the optical element 510.

The image included in the light flux 112 may include, for example, various content regarding the operation information of the vehicle 730 in which the display apparatus 310 is mounted such as "arrows" indicating the travel direction, the speed, etc.

As illustrated in FIG. 2, the image projection unit 115 of the display apparatus 310 may be provided, for example, inside the vehicle 730, that is, for example, in an inner portion of a dashboard 720 of the vehicle 730 as viewed by the human viewer 100, i.e., an operator.

The light flux 112 emitted from the image projection unit 115 is reflected by the windshield unit 710 and is incident on a head 105 of the human viewer 100. Specifically, the light flux 112 reaches an eye 101 of the human viewer 100. The human viewer 100 perceives an image 181 (a virtual image) of display content 180 included in the image formed at the position of an image formation position 181p via the windshield unit 710. Thus, the display apparatus 310 can be used as a HUD.

Thus, the display apparatus 310 includes the image projection unit 115 that projects a light flux including an image toward the human viewer 100 by using the optical element 510 according to this embodiment of the invention to reflect the light flux. The display apparatus may further include the optical element 510.

As illustrated in FIG. 1A and FIG. 1B, the optical element 510 according to this embodiment includes a first optical sheet 10 including a first Fresnel lens 10f provided in a first major surface 10a. An optical axis 13oa of the first Fresnel lens 10f is disposed at a position in the first major surface 10a different from the position of the center of the outline of the first major surface 10a (an outline center 13s).

In this specific example, the first Fresnel lens 10f is a convex Fresnel lens. However, the first Fresnel lens 10f may be a concave Fresnel lens. Hereinbelow, the case is described where the first Fresnel lens 10f is a convex Fresnel lens.

The first optical sheet 10 may include, for example, a material capable of transmitting visible light such as glass, a resin such as an acrylic resin, e.g., PMMA, etc. However, the material of the first optical sheet 10 may be any material capable of transmitting visible light.

A protrusion 11 having a convex curved surface is provided in the first major surface 10a; and multiple ridge portions 12 (e.g., a ridge portion 12a, a ridge portion 12b, a ridge portion 12c, a ridge portion 12d, etc., from a center 13o of the concentric circles toward the outside) having curved surfaces are provided in the first major surface 10a in concentric circular configurations around the protrusion 11. Thereby, the first Fresnel lens 10f is formed.

The thickness of the portion of each of the ridge portions 12 on the side proximal to the center 13o is greater than the thickness of the portion on the side distal to the center 13O.

In this specific example, a second major surface 10b on the side opposite to the first major surface 10a is substantially a plane.

Herein, a direction perpendicular to the first major surface 10a is taken as a Z-axis direction. One direction perpendicular to the Z-axis direction is taken as an X-axis direction. A direction perpendicular to the Z-axis direction and the X-axis direction is taken as a Y-axis direction.

The outline of the first major surface 10a (i.e., the outline of the optical element 510 as viewed from a direction perpendicular to the first major surface 10a) is, for example, rectangular. This embodiment is not limited thereto. The outline of the first major surface 10a may be circular, flattened circular, or rectangular with round corners.

Herein, the outline center 13s of the first major surface 10a is, for example, the midpoint of the outline along the Y-axis direction that is also the midpoint of the outline along the X-axis direction. In this specific example, a distance xs1 along the X-axis direction from one end of the outline of the first major surface 10a along the X-axis direction to the outline center 13s is equal to a distance xs2 along the X-axis direction from one other end of the outline of the first major surface 10a along the X-axis direction to the outline center 13s. Also, a distance ys1 along the Y-axis direction from one end of the outline of the first major surface 10a along the Y-axis direction to the outline center 13s is equal to a distance ys2 along the Y-axis direction from one other end of the outline of the first major surface 10a along the Y-axis direction to the outline center 13s.

On the other hand, the optical axis 13oa of the first Fresnel lens 10f of the first major surface 10a is the center of the protrusion 11 and is the center 13o of the concentric circles of the multiple ridge portions 12. The optical axis 13oa of the first Fresnel lens 10f is disposed at a position different from the position of the outline center 13s. In other words, in this specific example, a distance xo1 along the X-axis direction from one end of the outline of the first major surface 10a along the X-axis direction to the optical axis 13oa is different from a distance xo2 along the X-axis direction from one other end of the outline of the first major surface 10a along the X-axis direction to the optical axis 13oa. In other words, the optical axis 13oa is disposed at a position different from the position of the outline center 13s along the X-axis direction.

In this specific example, although a distance yo1 along the Y-axis direction from the one end of the outline of the first major surface 10a along the Y-axis direction to the optical axis 13oa is equal to a distance yo2 along the Y-axis direction from the one other end of the outline of the first major surface 10a along the Y-axis direction to the optical axis 13oa, the distance yo1 and the distance yo2 may be different from each other. In other words, the optical axis 13oa may be disposed at a position different from the position of the outline center 13s not only along the X-axis direction but also along the Y-axis direction.

The first major surface 10a of the optical element 510 is capable of reflecting and transmitting visible light. The optical element 510 can be applied in a HUD by, for example, being adhered on the inner side of the windshield 710a of the vehicle 730 with the first major surface 10a side opposing the windshield 710a. In other words, the optical element 510 can reflect the light flux 112 emitted from the image projection unit 115 of the display apparatus 310 toward the human viewer 100, transmit light of the scenery of the external environment of the vehicle 730, and provide the light to the human viewer 100.

In such a case, the optical element 510 according to this embodiment can improve the ease of viewing the HUD by the optical axis 13oa being shifted from the outline center 13s.

Figure 3A:
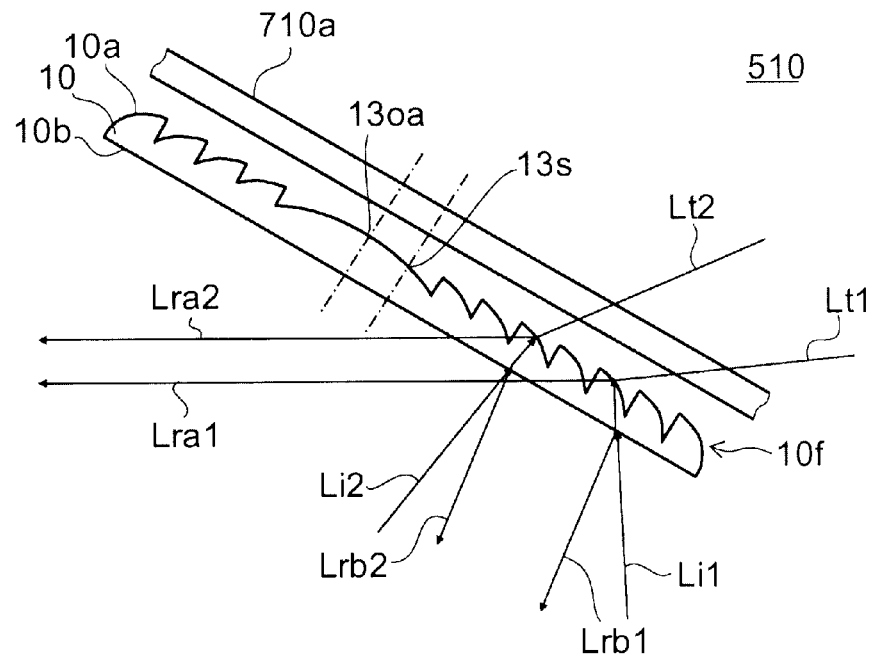
FIGS. 3A and 3B are schematic views illustrating operations of the optical element according to the first embodiment.
Figure 3B:
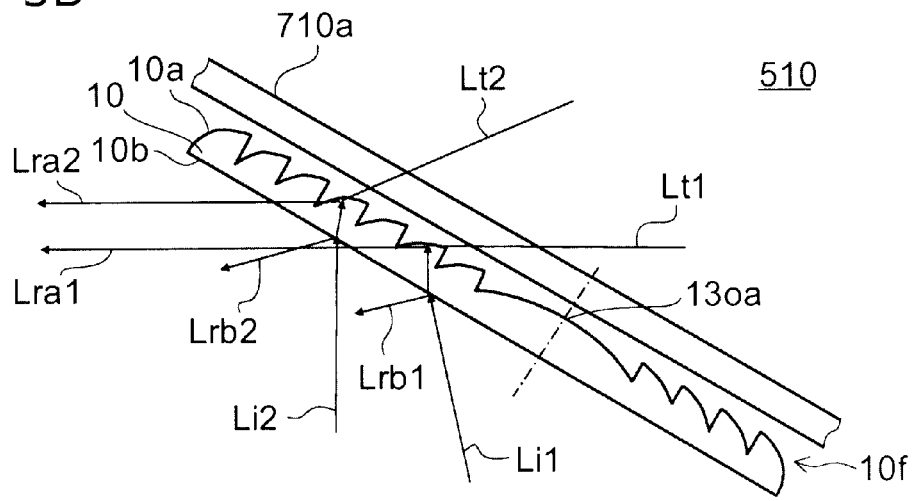

FIGS. 3A and 3B are schematic views illustrating operations of the optical element according to the first embodiment of the invention.

Namely, these schematic views illustrate two types of states of use of the optical element 510. In other words, FIG. 3A illustrates the state of the case where the optical element 510 is adhered to the windshield 710a with the optical axis 13oa of the optical element 510 disposed on the upper side of the outline center 13s. FIG. 3B illustrates the state of the case where the optical element 510 is adhered to the windshield 710a with the optical axis 13oa of the optical element 510 disposed on the lower side of the outline center 13s.

As illustrated in FIG. 3A, light Li1 from the image projection unit 115 (not illustrated) is incident on the optical element 510. A portion of the light Li1 enters into the optical element 510, is reflected by the first major surface 10a, and travels toward the human viewer 100 (not illustrated) as reflected light Lra1. On the other hand, one other portion of the light Li1 is reflected by the second major surface 10b of the optical element 510 and travels as reflected light Lrb1 at an angle different from that of the reflected light Lra1. In other words, the emergence angle of the reflected light Lra1 reflected by the first major surface 10a is different from the emergence angle of the reflected light Lrb1 reflected by the second major surface 10b. Similarly for light Li2 incident on the optical element 510, the emergence angle of reflected light Lra2 reflected by the first major surface 10a is different from the emergence angle of reflected light Lrb2 reflected by the second major surface 10b.

Thereby, the reflected light Lra1 and the reflected light Lra2 reflected by the first major surface 10a are projected toward the human viewer 100. The reflected light Lrb1 and the reflected light Lrb2 reflected by the second major surface 10b are not projected toward the human viewer 100. Thereby, the image included in the light flux 112 emitted from the image projection unit 115 does not form a double image.

As illustrated in FIG. 3B, for the light Li1 incident on the optical element 510 in the case where the optical axis 13oa is disposed on the lower side of the outline center 13s as well, the emergence angle of the reflected light Lra1 reflected by the first major surface 10a is different from the emergence angle of the reflected light Lrb1 reflected by the second major surface 10b. Similarly for the light Lit incident on the optical element 510, the emergence angle of the reflected light Lra2 reflected by the first major surface 10a is different from the emergence angle of the reflected light Lrb2 reflected by the second major surface 10b.

In this case as well, the reflected light Lra1 and the reflected light Lra2 reflected by the first major surface 10a are projected toward the human viewer 100; the reflected light Lrb1 and the reflected light Lrb2 reflected by the second major surface 10b are not projected toward the human viewer 100; and the image included in the light flux 112 does not form a double image.

Further, as illustrated in FIG. 3A and FIG. 3B, transmitted light Lt1 and transmitted light Lt2 pass through the first major surface 10a and reach the human viewer 100. Thereby, the human viewer can simultaneously view the image from the image projection unit 115 and, for example, an external environment scenery included in the transmitted light passing through the optical element 510.

COMPARATIVE EXAMPLE

Figure 4:
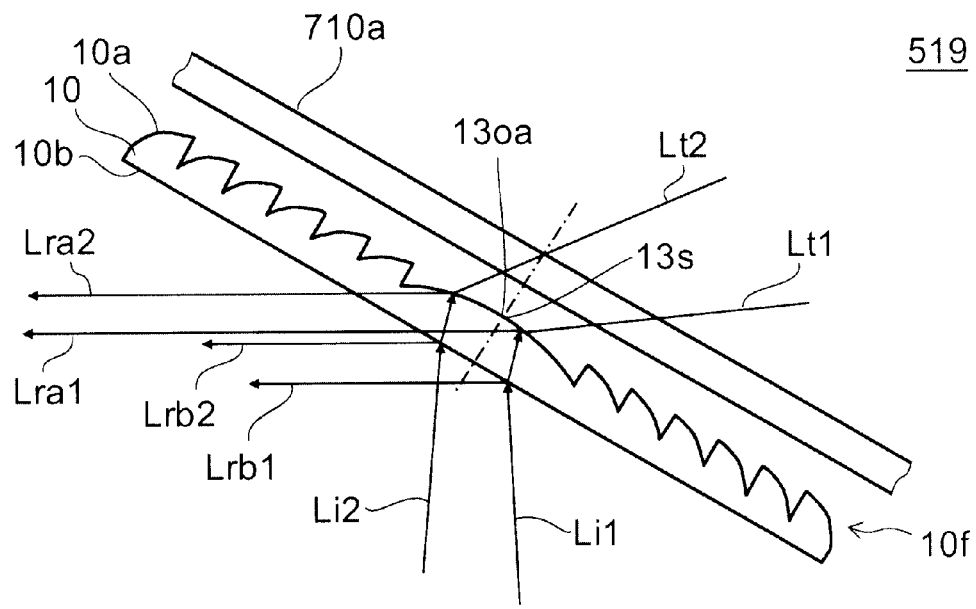
FIG. 4 is a schematic view illustrating operations of an optical element of a comparative example.

FIG. 4 is a schematic view illustrating operations of an optical element of a comparative example.

In an optical element 519 of the comparative example as illustrated in FIG. 4, the position of the optical axis 13oa of the first Fresnel lens 10f at the first major surface 10a matches the position of the outline center 13s of the first major surface 10a.

For the light Li1 incident on the optical element 519 in such a case, the difference between the emergence angle of the reflected light Lra1 reflected by the first major surface 10a and the emergence angle of the reflected light Lrb1 reflected by the second major surface 10b decreases; and the angles become, for example, substantially the same. Similarly for the light Li2 incident on the optical element 510, the emergence angle of the reflected light Lra2 reflected by the first major surface 10a becomes the same as the emergence angle of the reflected light Lrb2 reflected by the second major surface 10b.

Thereby, in addition to the reflected light Lra1 and the reflected light Lra2 reflected by the first major surface 10a, the reflected light Lrb1 and the reflected light Lrb2 reflected by the second major surface 10b also are projected toward the human viewer 100. Thereby, the image included in the light flux 112 emitted from the image projection unit 115 forms a double image.

Figure 5A:
FIGS. 5A and 5B are schematic views illustrating characteristics of the optical elements.
Figure 5B:
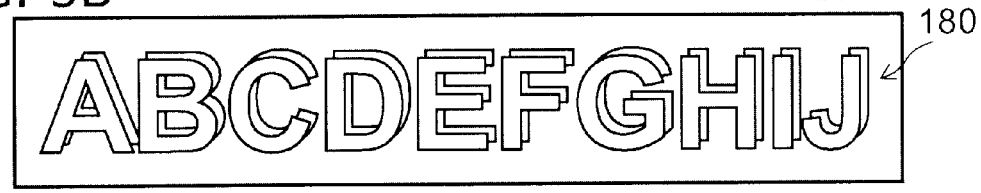

FIGS. 5A and 5B are schematic views illustrating characteristics of the optical elements.

Namely, FIG. 5A illustrates the characteristic of the optical element 510 according to this embodiment; and FIG. 5B illustrates the characteristic of the optical element 519 of the comparative example. FIG. 5A corresponds to the characteristic of the state of use illustrated in FIG. 4A or FIG. 4B. FIG. 5A and FIG. 5B illustrate the images perceived when the human viewer 100 views the display content 180 of the image included in the image projection unit 115 via the optical element 510 or the optical element 519.

In the case where the optical element 510 according to this embodiment is used as illustrated in FIG. 5A, the display content 180 is not formed in a double image; and the display content 180 is perceived clearly.

On the other hand, in the case where the optical element 519 of the comparative example is used as illustrated in FIG. 5B, the display content 180 is formed in a double image and is perceived unclearly.

Thus, the optical element 510 according to this embodiment suppresses the image presented to the human viewer 100 from being a double image by the reflection angle of the light reflected by the first major surface 10a being different from the reflection angle of the light reflected by the second major surface 10b by the optical axis 13oa of the first Fresnel lens 10f being disposed at a position different from the position of the outline center 13s of the first major surface 10a. Thus, this embodiment can improve the ease of viewing the HUD.

Moreover, because the first major surface 10a including the first Fresnel lens 10f is capable of transmitting and reflecting, the first major surface 10a functions as a concave mirror that enlarges the reflected image. Thereby, an optical component having the function of enlarging the image included in the image projection unit 115 can be omitted; or the specifications of such an optical component can be relaxed. Thereby, the image projection unit 115 can be downsized. Further, by using a Fresnel lens instead of a normal lens as the optical element 510, the optical element 510 can be thinner.

Thus, according to the optical element 510, an optical element can be provided to improve the ease of viewing a HUD and downsize the display apparatus 310. In the display apparatus 310, it is possible to improve the ease of viewing while downsizing.

Examples of distances between the outline center 13s and the optical axis 13oa of the first Fresnel lens 10f of the optical element 510 according to this embodiment will now be described.

Figure 6:
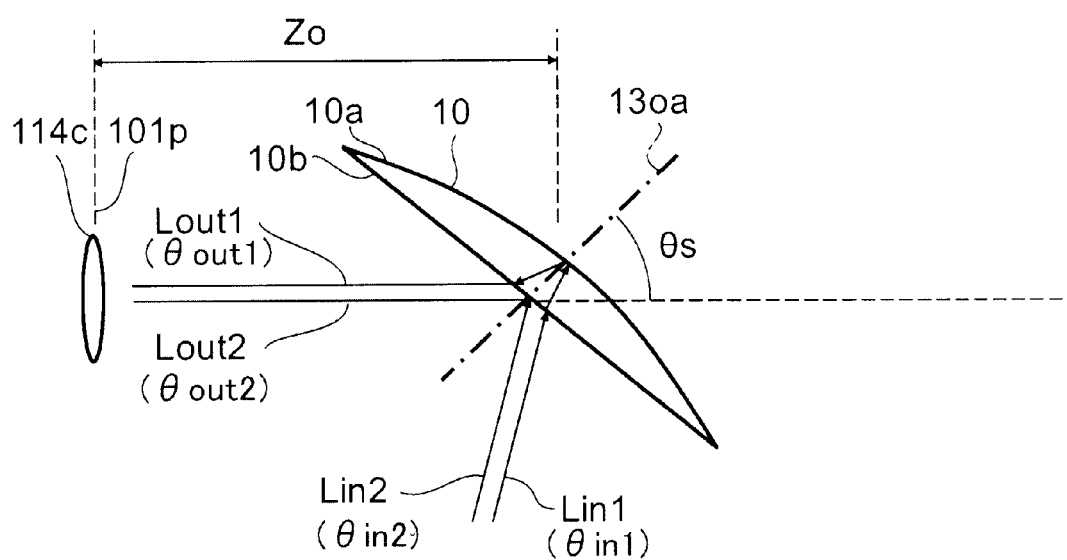
FIG. 6 is a schematic view illustrating operations of the optical element according to the first embodiment.

FIG. 6 is a schematic view illustrating operations of the optical element according to the first embodiment of the invention.

In FIG. 6, the first optical sheet 10 is illustrated as a simple plano-convex lens.

As illustrated in FIG. 6, a first incident light Lin1 incident on the second major surface 10b of the first optical sheet 10 passes through the first optical sheet 10, is reflected by the first major surface 10a, and emerges at a first reflection angle θout1 as a first reflected light Lout1. On the other hand, a second incident light Lin2 incident on the second major surface 10b of the first optical sheet 10 is reflected by the second major surface 10b at a second reflection angle θout2 as a second reflected light Lout2.

Herein, the refractive index of the first optical sheet 10 is taken to be 1.492 (e.g., the value of the refractive index of PMMA); and the refractive index of the external environment of the first optical sheet 10 is taken to be 1.0 (the value of the refractive index of air). The angle between the horizontal axis and the optical axis 13oa of the first optical sheet 10 is taken to be 45 degrees. The curvature radius of the first Fresnel lens 10f of the first optical sheet 10 is taken to be 750 mm (millimeters). A distance Zo from a position 101p of the eye 101 of the human viewer 100 to the center of the first optical sheet 10 is taken to be 800 mm. The width of a viewing region 114c at the position of the human viewer 100 is taken to be 60 mm.

For such conditions, the conditions at which a double image substantially does not occur are the conditions at which the first reflected light Lout1 reflected by the first major surface 10a of the first optical sheet 10 and the second reflected light Lout2 reflected by the second major surface 10b are not simultaneously incident on the viewing region 114c. In other words, in this specific example, a double image substantially does not occur in the case where the first reflection angle θout1 of the first reflected light Lout1 is different from the second reflection angle θout2 of the second reflected light Lout2 by not less than 5 degrees.

Thus, in the optical element 510 according to this embodiment, it is desirable for the first reflection angle θout1 of the reflected light incident on the second major surface 10b and reflected by the first major surface 10a to be different from the second reflection angle θout2 of the reflected light reflected by the second major surface 10b by not less than 5 degrees.

Then, the conditions at which the first reflection angle θout1 is different from the second reflection angle θout2 by not less than 5 degrees are the conditions at which the distance between the optical axis 13oa and the outline center 13s is not less than 15 mm.

Thus, in the optical element 510 according to this embodiment, it is desirable for the distance from the position of the optical axis 13oa of the first Fresnel lens 10f at the first major surface 10a to the position of the outline center 13s of the first major surface 10a to be not less than 15 mm.

It is desirable for each of the ridge portions 12 of the first Fresnel lens 10f provided in the first optical sheet 10 of the optical element 510 to be substantially unperceivable to the human viewer 100. For example, in the case where the vision of the human viewer 100 is 1.0, two points separated from each other by a distance of 0.3 mm can be identified when disposed at a location 1 m from the human viewer 100. In such a case, it is desirable for the width of the ridge portion 12 of the first Fresnel lens 10f to be not more than 0.3 mm. Further, in the case where the vision of the human viewer 100 is, for example, 0.7, two points separated from each other by a distance of 0.43 mm can be identified when disposed at a location 1 m from the human viewer 100. In such a case, it is desirable for the width of the ridge portion 12 of the first Fresnel lens 10f to be not more than 0.43 mm.

In the case where it is supposed that the vision of the human viewer 100 is not less than 0.7 for the conditions at which the optical element 510 is used as a HUD for the vehicle 730, it is desirable for the width of the ridge portion 12 to be not more than 0.43 mm.

In other words, the first Fresnel lens 10f includes the multiple ridge portions 12 having concentric circular configurations centered on the optical axis 13oa; and the width of each of the multiple ridge portions 12 along the radial direction from the optical axis 13oa toward the outside of the concentric circles may be set to be not more than 0.43 mm. Thereby, the ridge portions 12 are substantially unperceivable; and the ease of viewing the HUD improves further.

In the case where diffraction occurs due to the ridge portions 12, a fringe pattern based on the diffraction is visible; and the image may be difficult to view. Therefore, the width of the ridge portion 12 may be set in a range in which diffraction does not occur. In other words, the first Fresnel lens 10f includes the multiple ridge portions 12 having concentric circular configurations centered on the optical axis 13oa; and it is desirable for the width of each of the multiple ridge portions 12 along the radial direction from the optical axis 13oa toward the outside of the concentric circles to be not less than 0.01 mm.

As described above, the first major surface 10a of the optical element 510 is capable of reflecting and transmitting visible light. In such a case, assuming the absorbency index to be 0, the transmittance of the first major surface 10a with respect to visible light can be taken to be not less than 70%. In such a case, the reflectance of the first major surface 10a with respect to visible light is less than 30%.

When the transmittance of the first major surface 10a with respect to visible light is too low, the scenery image of the external environment passing through the optical element 510 becomes difficult to view; and when the transmittance is too high, the image from the image projection unit 115 reflected by the optical element 510 becomes difficult to view.

Thus, the first major surface 10a of the optical element 510 can reflect and transmit.

Although, for example, a Fresnel lens may be used to enlarge or reduce an image by refracting transmitted light, in such a case, the Fresnel lens transmits but substantially does not reflect. Further, although a Fresnel lens may be used as a mirror to enlarge or reduce a reflected image, in such a case, the Fresnel lens reflects but substantially does not transmit.

Conversely, because the optical element 510 according to this embodiment is used as the reflecting unit 711 that reflects the light flux 112 in, for example, a HUD, it is necessary to efficiently reflect the light flux 112 and simultaneously transmit the light of the scenery image of the external environment. Accordingly, the optical element 510 is capable of reflecting and transmitting visible light. By using an outline center 13s having a position different from the position of the optical axis 13oa of such a first Fresnel lens capable of reflecting and transmitting, the occurrence of a double image of the image included in the light flux 112 can be suppressed; and the ease of viewing the HUD can be improved.

Examples of configurations in which the first major surface 10a is provided with the ability to reflect and transmit will now be described.

FIGS. 7A to 7E are schematic cross-sectional views illustrating the configurations of optical elements according to the first embodiment of the invention.

Namely, these drawings are schematic cross-sectional views corresponding to the cross section along line A1-A2 of FIG. 1A.

Figure 7:
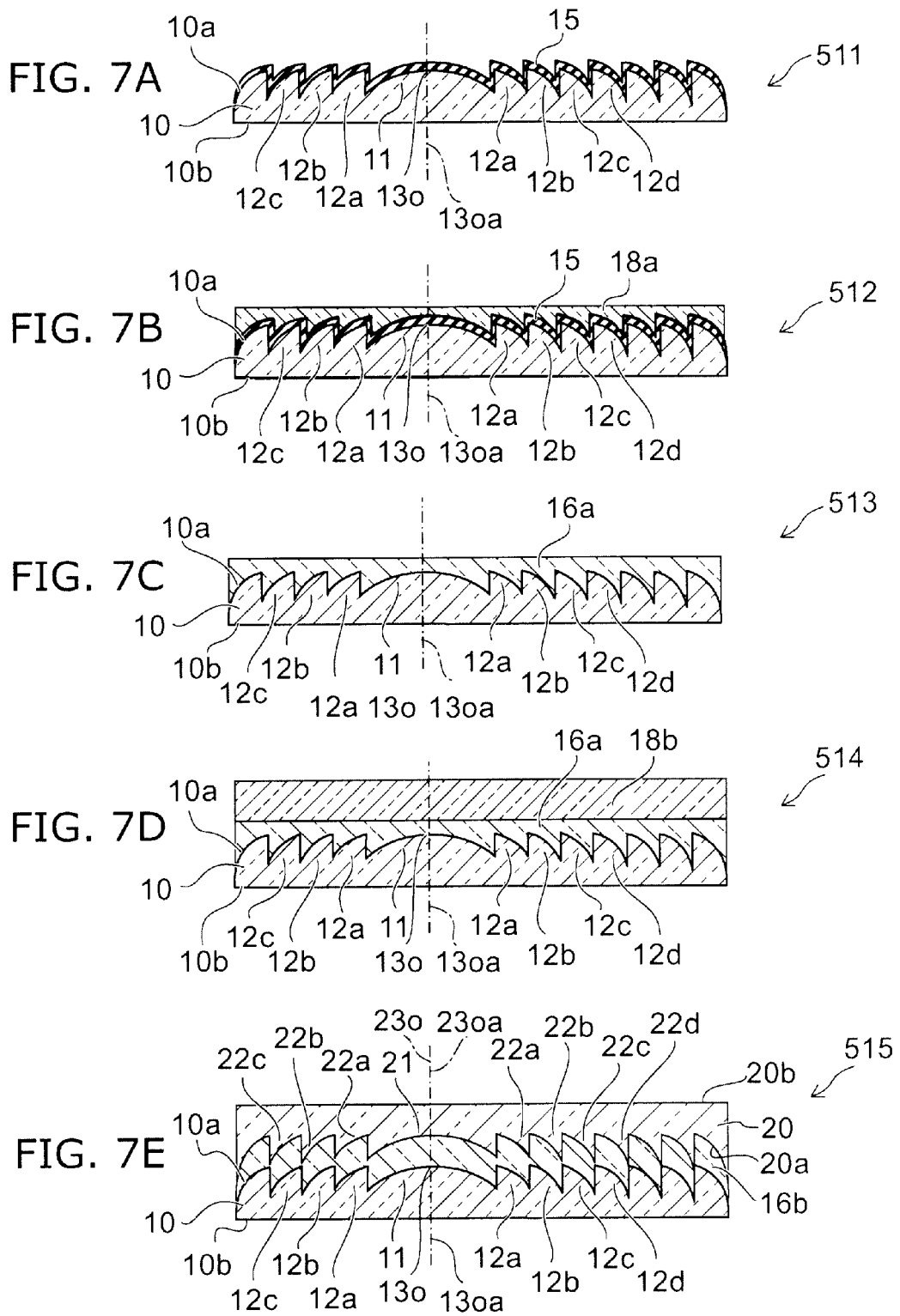
FIGS. 7A to 7E are schematic cross-sectional views illustrating the configurations of optical elements according to the first embodiment.

As illustrated in FIG. 7A, an optical element 511 according to this embodiment further includes, in addition to the first optical sheet 10, a transmissive reflective optical layer 15 provided in the first major surface 10a of the first optical sheet 10 and capable of reflecting and transmitting visible light.

Otherwise, the optical element 511 is similar to the optical element 510, and a description is therefore omitted.

The transmissive reflective optical layer 15 may include, for example, a thin film of a metal such as aluminum, etc., a thin film of a metal oxide and the like, an organic thin film, etc. In the case where the transmissive reflective optical layer 15 includes a metal, the thickness of the transmissive reflective optical layer 15 is controlled to be a thickness at which the transmissive reflective optical layer 15 is capable of reflecting and transmitting. The transmissive reflective optical layer 15 may be a single-layer film or a stacked multiple-layer film. The transmissive reflective optical layer 15 also may include an AR coating layer used in antireflective layers. A dielectric multiple-layer film may be used as the AR coating film. In the case where the dielectric multiple-layer film is used, the reflectance can be controlled by the incident angle; the reflectance at the desired incident angle can be increased; and the efficiency can be increased.

Any method such as dry film formation methods such as vapor deposition, sputtering, CVD, etc., wet film formation methods such as coating, etc., may be employed as the formation method of the transmissive reflective optical layer 15.

The transmittance of the transmissive reflective optical layer 15 with respect to visible light may be set to be not less than 70%.

As illustrated in FIG. 7B, an optical element 512 according to this embodiment further includes, in addition to the first optical sheet 10 and the transmissive reflective optical layer 15, a first transparent layer 18a. The first transparent layer 18a is provided on the first major surface 10a side of the first optical sheet 10 and is transparent to visible light. In this specific example, the first transparent layer 18a is provided on the side of the transmissive reflective optical layer 15 opposite to the first optical sheet 10. Otherwise, the optical element 512 is similar to the optical element 511, and a description is therefore omitted.

The first transparent layer 18a may include, for example, a transparent resin such as an acrylic resin. The first transparent layer 18a functions as, for example, an adhesive layer. The first transparent layer 18a can be used to adhere the optical element 512 to, for example, the windshield 710a. In such a case, the refractive index of the first transparent layer 18a may be substantially the same as the refractive index of the windshield 710a. Thereby, reflections between the first transparent layer 18a and the windshield 710a can be suppressed; and a bright display can be obtained.

As illustrated in FIG. 7C, an optical element 513 according to this embodiment includes the first optical sheet 10 and further includes a first high refractive index layer 16a provided on the first major surface 10a of the first optical sheet 10 and having a refractive index higher than that of the first optical sheet 10. Otherwise, the optical element 513 is similar to the optical element 510, and a description is therefore omitted.

Because the first high refractive index layer 16a has a refractive index higher than that of the first optical sheet 10, the first major surface 10a is capable of reflecting and transmitting. The first high refractive index layer 16a may include, for example, a compound layer such as a metal oxide film, a resin layer, etc., having a refractive index higher than that of the first optical sheet 10. By providing the first high refractive index layer 16a, the transmittance of the first major surface 10a of the optical element 513 with respect to visible light can be set to be not less than 70%.

As illustrated in FIG. 7D, an optical element 514 according to this embodiment further includes, in addition to the first optical sheet 10 and the first high refractive index layer 16a, a second transparent layer 18b. The second transparent layer 18b is provided on the first major surface 10a of the first optical sheet 10 and is transparent to visible light. In this specific example, the second transparent layer 18b is provided on the side of the first high refractive index layer 16a opposite to the first optical sheet 10. Otherwise, the optical element 514 is similar to the optical element 513, and a description is therefore omitted.

The second transparent layer 18b may include, for example, a transparent resin sheet of PET and the like. Thereby, for example, the first high refractive index layer 16a can be protected; and the reliability of the optical element 514 can be increased.

The first transparent layer 18a recited above may be further provided on the side of the second transparent layer 18b opposite to the first optical sheet 10. In such a case as well, the first transparent layer 18a functions, for example, as an adhesive layer.

The refractive indexes of the first transparent layer 18a and the second transparent layer 18b may be substantially the same as the refractive index of the windshield 710a. Thereby, reflections between the first transparent layer 18a, the second transparent layer 18b, and the windshield 710a can be suppressed; and a bright display can be obtained. Further, the refractive index of the first transparent layer 18a may be set to a value between the refractive index of the second transparent layer 18b and the refractive index of the windshield 710a. Thereby, the reflections between the first transparent layer 18a, the second transparent layer 18b, and the windshield 710a can be suppressed; and a bright display can be obtained.

As illustrated in FIG. 7E, an optical element 515 according to this embodiment further includes, in addition to the first optical sheet 10, a second optical sheet 20 and a second high refractive index layer 16b. Otherwise, the optical element 515 is similar to the optical element 510, and a description is therefore omitted.

The second optical sheet 20 includes a second Fresnel lens 20f provided in a third major surface 20a opposing the first major surface 10a. In the case where the first Fresnel lens 10f is a convex Fresnel lens, the second Fresnel lens 20f is a concave Fresnel lens; and in the case where the first Fresnel lens 10f is a concave Fresnel lens, the second Fresnel lens 20f is a convex Fresnel lens. Hereinbelow, the case is described where the first Fresnel lens 10f is a convex Fresnel lens and the second Fresnel lens 20f is a concave Fresnel lens.

The second high refractive index layer 16b is provided between the first optical sheet 10 and the second optical sheet 20. The second high refractive index layer 16b has a refractive index higher than the refractive index of the first optical sheet 10. The refractive index of the second high refractive index layer 16b may be set to be higher than the refractive index of the second optical sheet 20.

In such a case as well, in the first optical sheet 10, the optical axis 13oa of the first Fresnel lens 10f is disposed at a position different from the position of the center (the outline center 13s) of the outline of the first major surface 10a.

The position of an optical axis 23oa of the second Fresnel lens 20f is substantially matched to the position of the optical axis 13oa of the first Fresnel lens 10f.

In other words, the outline of the third major surface 20a of the second Fresnel lens 20f is, for example, the same as the outline of the first Fresnel lens 10f. In the second Fresnel lens 20f as well, the optical axis 23oa of the second Fresnel lens 20f at the third major surface 20a is disposed at a position different from the position of the center of the outline of the third major surface 20a.

A recess 21 having a concave curved surface is provided in the third major surface 20a of the second Fresnel lens 20f; and multiple groove portions 22 (e.g., a groove portion 22a, a groove portion 22b, a groove portion 22c, a groove portion 22d, etc. from a center 23o of the concentric circles toward the outside) having curved surfaces are provided in concentric circular configurations around the recess 21. Thereby, the second Fresnel lens 20f is formed. The thickness of the portion of each of the groove portions 22 on the side proximal to the center 23o is less than the thickness of the portion on the side distal to the center 13o. In this specific example, a fourth major surface 20b on the side opposite to the third major surface 20a is substantially a plane.

The multiple ridge portions 12 of the first Fresnel lens 10f oppose the multiple groove portions 22 of the second Fresnel lens 20f respectively.

For example, as described above, the first Fresnel lens 10f includes the multiple ridge portions 12 having concentric circular configurations centered on the optical axis 13oa of the first Fresnel lens 10f; and the second Fresnel lens 20f includes the multiple groove portions 22 having concentric circular configurations centered on the optical axis 23oa of the second Fresnel lens 20f. Then, the width of the ridge portion 12 positioned a distance (the first distance) along the radial direction from the optical axis 13oa of the first Fresnel lens 10f toward the outside of the concentric circles is substantially the same as the width of the groove portion 22 positioned the first distance recited above along the radial direction from the optical axis 23oa of the second Fresnel lens 20f toward the outside of the concentric circles.

The curvature of the groove portion 22 may be set to be substantially equal to the curvature of the ridge portion 12.

By providing the second high refractive index layer 16b on the first major surface 10a of the first optical sheet 10 in the optical element 515 having such a configuration, the first major surface 10a is capable of reflecting and transmitting. By providing the second optical sheet 20 in addition to the first optical sheet 10, the shift of the optical path when light passes through the ridge portion 12 can be corrected by the second optical sheet 20. Thereby, the distortion of the image of the scenery of the external environment can be suppressed. In such a case as well, by disposing the optical axis 13oa of the first optical sheet 10 and the optical axis 23oa of the second optical sheet 20 at positions different from the position of the outline center 13s of the first major surface 10a (i.e., the third major surface 20a), the ease of viewing the HUD can be improved.

Thus, in the optical element according to this embodiment, the positions of the multiple images generated by the first major surface 10a and the second major surface 10b of the optical element can be changed from each other; and overlapping of these images is suppressed. For example, in the optical element 514 illustrated in FIG. 7D, a Fresnel mirror surface, which performs the role of a concave mirror interposed between planes frontward and rearward, is used. Then, by shifting the optical axis of the Fresnel mirror surface from the center of the outline of the Fresnel mirror surface, the perception of multiple images is suppressed. By using an optical element such as the reflecting unit 711 of the HUD, it is possible to downsize the display apparatus while improving the ease of viewing the HUD.

Second Embodiment

Figure 8:
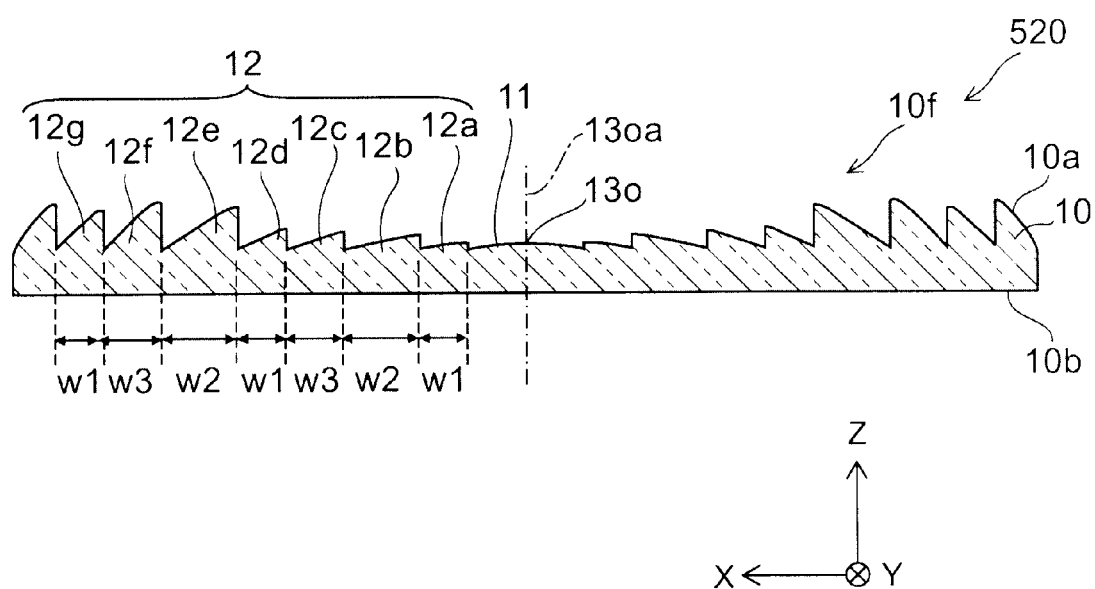
FIG. 8 is a schematic cross-sectional view illustrating the configuration of an optical element according to a second embodiment.

FIG. 8 is a schematic cross-sectional view illustrating the configuration of an optical element according to a second embodiment of the invention.

As illustrated in FIG. 8, the optical element 520 according to this embodiment includes the first optical sheet 10 including the first Fresnel lens 10f provided in the first major surface 10a, where the first Fresnel lens 10f includes the multiple ridge portions 12 having concentric circular configurations. The optical element 520 also may be adhered, for example, to the windshield 710a of the vehicle 730 and used as the reflecting unit 711 of the HUD. In such a case as well, the first major surface 10a is capable of reflecting and transmitting visible light.

As illustrated in FIG. 8, of the multiple ridge portions 12 in the optical element 520, the widths along the radial direction from the center 13o of the concentric circles toward the outside of mutually adjacent ridge portions 12 are different from each other. The width along the radial direction of each of the multiple ridge portions 12 is not more than a predetermined length.

Of the multiple ridge portions 12 in this specific example, for each of the combinations of two mutually adjacent ridge portions 12, the widths of the two ridge portions 12 along the radial direction from the center of the concentric circles toward the outside are different from each other; and the width along the radial direction of each of the multiple ridge portions 12 is not more than a predetermined prescribed length. In other words, the widths of the ridge portions 12 are different from each other for all of the combinations of adjacent ridge portions.

For example, in the case where the ridge portion 12a, the ridge portion 12b, the ridge portion 12c, the ridge portion 12d, a ridge portion 12e, a ridge portion 12f, a ridge portion 12g, etc., are provided from the inner side of the concentric circles as illustrated in FIG. 8, the width of the ridge portion 12a is a first width w1; the width of the ridge portion 12b is a second width w2; the width of the ridge portion 12c is a third width w3; the width of the ridge portion 12d is the first width w1; the width of the ridge portion 12e is the second width w2; the width of the ridge portion 12f is the third width w3; and the width of the ridge portion 12g is the first width w1. The second width w2 is different from the first width w1; the third width w3 is different from the first width w1; and the third width w3 is different from the second width w2.

Thus, the widths of mutually adjacent ridge portions 12 are different from each other. Thereby, a fringe pattern due to diffraction effects of the ridge portions 12 can be suppressed.

The width of the ridge portion 12 is set to be not more than a predetermined length. A length for which two of the ridge portions 12 are substantially unidentifiable can be employed as the predetermined width based on the vision of the human viewer 100 and the distance between the human viewer 100 and the optical element 520. Thereby, each of the multiple ridge portions 12 is not recognized; and the fringe pattern due to the multiple ridge portions 12 is not perceived.

Specifically, in the case where the optical element 520 is applied in a HUD for a vehicle, 0.43 mm can be employed as the predetermined width recited above assuming the case where the vision of the human viewer 100 is 0.7 and the distance between the human viewer 100 and the optical element 520 is 1 m. In other words, it is desirable for the width of the ridge portion 12 to be not more than 0.43 mm.

0.3 mm can be employed as the predetermined width recited above assuming the case where the vision of the human viewer 100 is 1.0 and the distance between the human viewer 100 and the optical element 520 is 1 m. In other words, the width of the ridge portion 12 may be not more than 0.3 mm.

Generally, the fringe pattern due to the diffraction effects is perceived more easily in the case where the widths of the ridge portions 12 are reduced in a state of the width being constant between the ridge portions 12. On the other hand, in the case where the widths of the ridge portions 12 are increased, the ridge portions 12 themselves are perceived. In the optical element 520 according to this embodiment, the diffraction effects are suppressed by mutually adjacent ridge portions 12 of the multiple ridge portions 12 having widths different from each other while setting the widths of the ridge portions 12 to values small enough that the ridge portions 12 themselves are not perceived. Thereby, the ridge portions 12 themselves substantially are not perceived while the fringe pattern due to the diffraction effects is suppressed. Thereby, the ease of viewing the HUD can be improved.

Simulation results of changes of characteristics of the optical element when the width of the ridge portion 12 is changed will now be described.

FIGS. 9A and 9B and FIGS. 10A and 10B are graphs illustrating characteristics of optical elements.

Figure 9A:
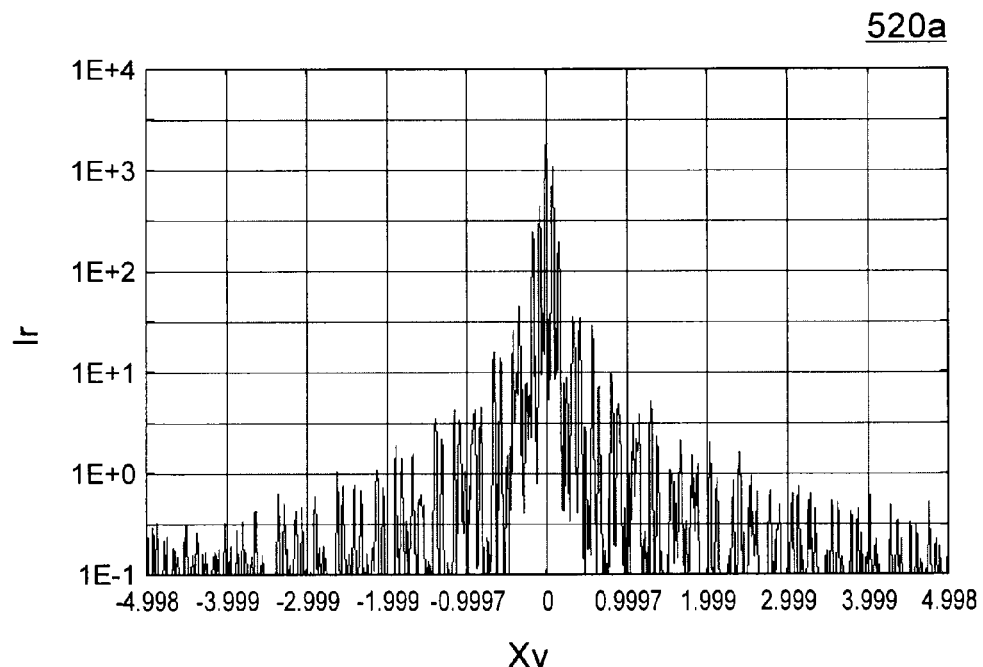
FIGS. 9A and 9B are graphs illustrating characteristics of optical elements.

Namely, FIG. 9A illustrates the characteristic of an optical element 520a in the case where the widths of the ridge portions 12 change within 0.28 mm±0.10 mm (e.g., the case where the first width w1 is 0.28 mm, the second width w2 is 0.28 mm+0.10 mm, and the third width w3 is 0.28 mm−0.10 mm).

Figure 9B:
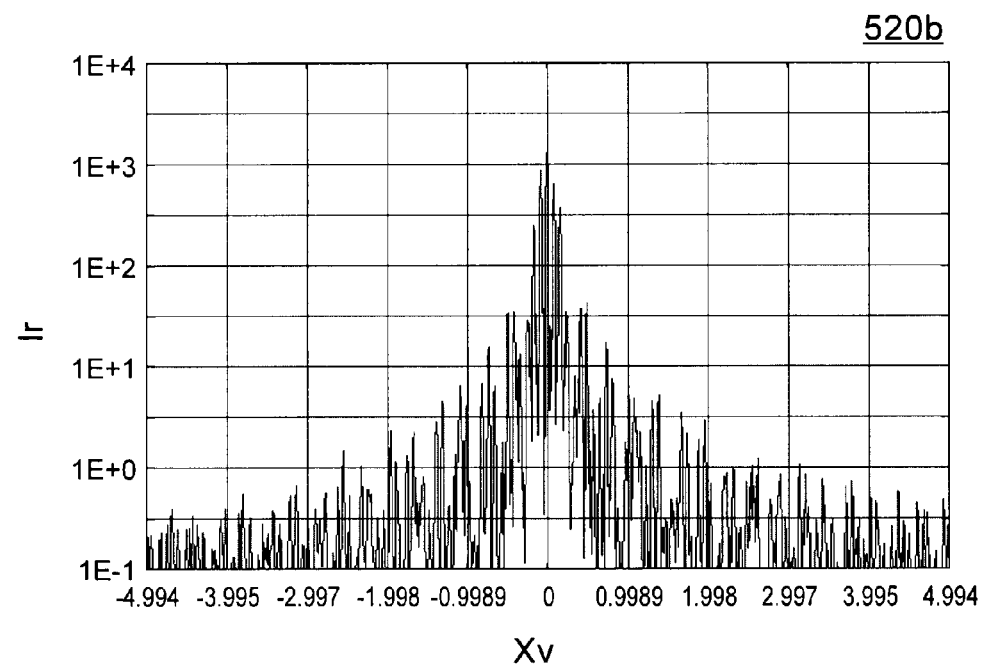

FIG. 9B illustrates the characteristic of an optical element 520b in the case where the widths of the ridge portions 12 change within 0.28 mm±0.05 mm (e.g., the case where the first width w1 is 0.28 mm, the second width w2 is 0.28 mm+0.05 mm, and the third width w3 is 0.28 mm−0.05 mm).

Figure 10A:
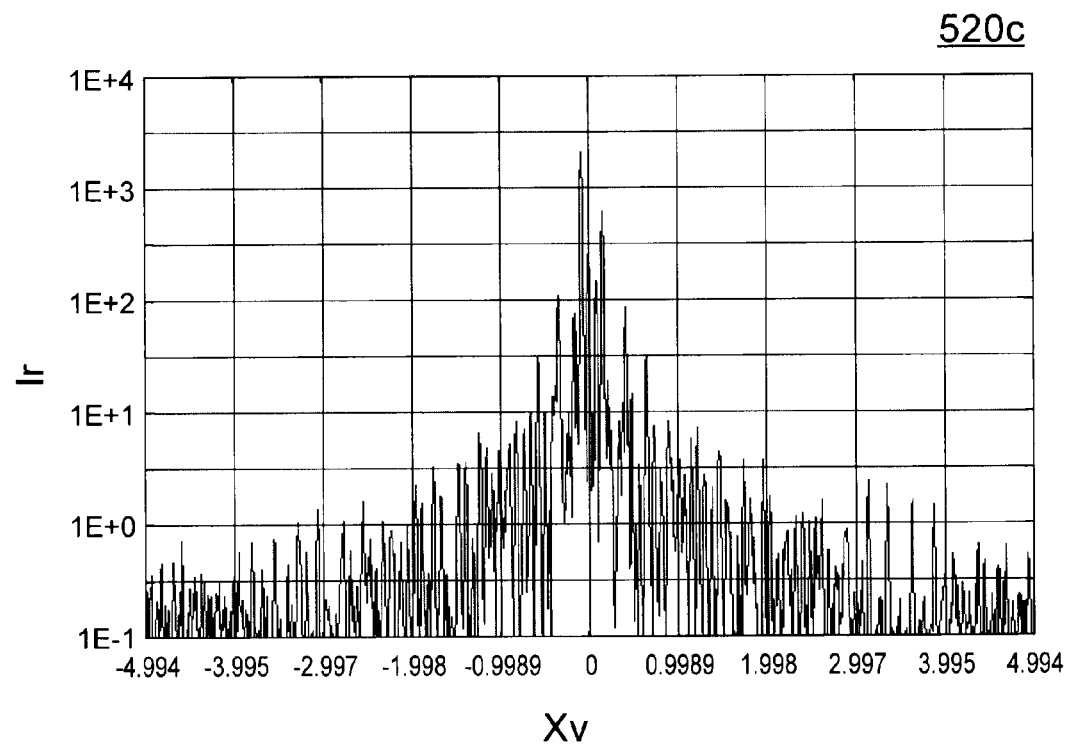
FIGS. 10A and 10B are graphs illustrating characteristics of optical elements.

FIG. 10A illustrates the characteristic of an optical element 520c in the case where the widths of the ridge portions 12 change within 0.28 mm+0.02 mm (e.g., the case where the first width w1 is 0.28 mm, the second width w2 is 0.28 mm+0.02 mm, and the third width w3 is 0.28 mm−0.02 mm).

Figure 10B:
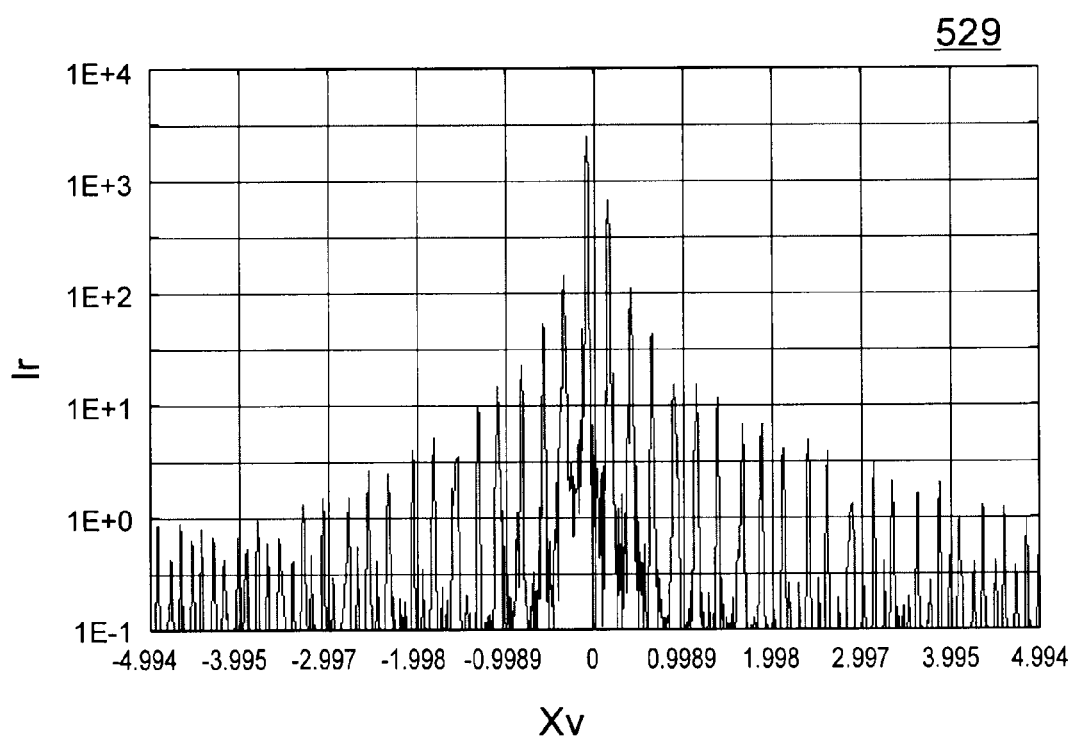

FIG. 10B illustrates the characteristic of an optical element 529 of a comparative example in the case where the widths of the ridge portions 12 are constant at 0.28 mm.

In these drawings, the horizontal axis is a position Xv (e.g., a relative position along the X-axis direction); and the vertical axis is a relative light intensity Ir.

In the optical element 529 of the comparative example in which the widths of the ridge portions 12 are constant at 0.28 mm as illustrated in FIG. 10B, there are light peaks where the light intensity Ir is locally high; and the spacing (the spacing along the position Xv) between the light peaks is large. In other words, it is easy to observe the fringe pattern corresponding to the light peaks in the optical element 529 of the comparative example.

In the optical element 520c according to this embodiment in which the widths of the ridge portions 12 change within 0.28 mm±0.02 mm as illustrated in FIG. 10A, the spacing between the light peaks is narrow and there are many fine peaks. In other words, in the optical element 520c, it is not easy to observe a fringe pattern corresponding to the light peaks.

Further, in the optical element 520b according to this embodiment in which the widths of the ridge portions 12 change within 0.28 mm±0.05 mm as illustrated in FIG. 9B, the spacing between the light peaks is narrow and there are many fine peaks. Also in the optical element 520a according to this embodiment in which the widths of the ridge portions 12 change within 0.28 mm±0.10 mm as illustrated in FIG. 9A, the spacing between the light peaks is narrow and there are many fine peaks. It is more difficult to observe the fringe pattern in the optical element 520b than in the optical element 520c; and it is more difficult to observe the fringe pattern in the optical element 520a than in the optical element 520b.

Thus, by increasing the change amount of the widths of the ridge portions 12, the diffraction effects can be reduced further; and it is more difficult to perceive the fringe pattern.

Of the multiple ridge portions of the optical element according to this embodiment, the difference of the widths between the mutually adjacent ridge portions 12 can be, for example, not less than 0.05 mm. Thereby, the diffraction effects can be reduced further; and it can be more difficult to perceive the fringe pattern. However, the embodiments of the invention are not limited thereto. It is sufficient for the fringe pattern due to diffraction to be suppressed by the mutually adjacent ridge portions 12 having mutually different widths; and the difference of the widths of the multiple ridge portions 12 is arbitrary.

Although the case is recited above where the widths of ridge portions 12 are different from each other for all of the adjacent ridge portions, this embodiment is not limited thereto. Any two mutually adjacent ridge portions 12 of the multiple ridge portions 12 may have mutually different widths. For example, even in the case where a fringe pattern occurs for the ridge portions 12 provided at the peripheral portion of the optical element 520, there are cases where the fringe pattern practically is not a problem because the fringe pattern is not easily noticeable. In such a case, the widths of any two mutually adjacent ridge portions 12 may be set to be different from each other at the central portion of the optical element 520 where the fringe pattern is practically noticeable easily.

Figure 11:
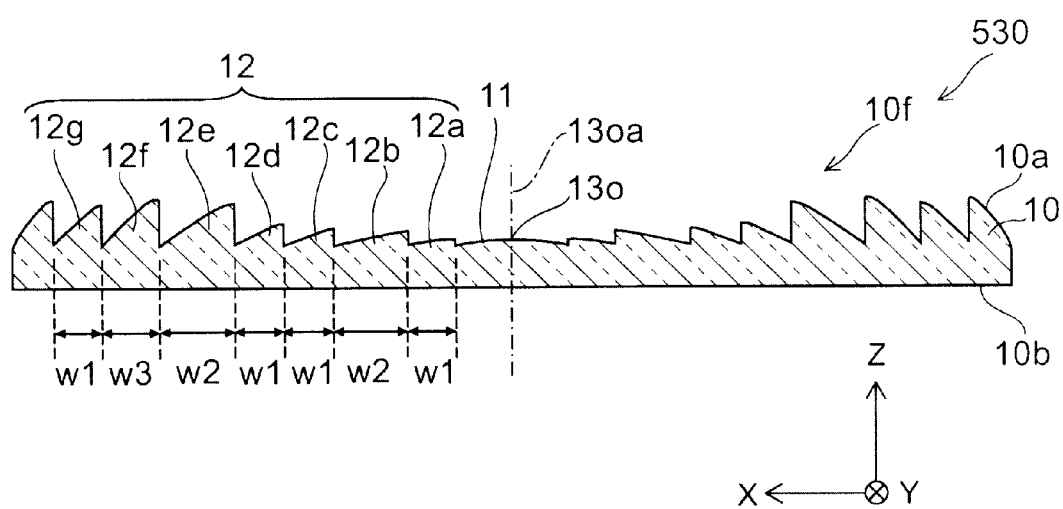
FIG. 11 is a schematic cross-sectional view illustrating the configuration of another optical element of the second embodiment.

FIG. 11 is a schematic cross-sectional view illustrating the configuration of another optical element of the second embodiment of the invention.

As illustrated in FIG. 11, the optical element 530 according to this embodiment also includes the first optical sheet 10 including the first Fresnel lens 10f provided in the first major surface 10a, where the first Fresnel lens 10f includes the multiple ridge portions 12 having concentric circular configurations. Of the multiple ridge portions 12, the widths of two adjacent ridge portions 12 along the radial direction from the center of the concentric circles toward the outside are the same; and the total of the widths of the two adjacent ridge portions 12 along the radial direction is not more than a predetermined length.

For example, as illustrated in FIG. 11, the width of the ridge portion 12a is the first width w1; the width of the ridge portion 12b is the second width w2; the width of the ridge portion 12c is the first width w1; the width of the ridge portion 12d is the first width w1; the width of the ridge portion 12e is the second width w2; the width of the ridge portion 12f is the third width w3; and the width of the ridge portion 12g is the first width w1. The second width w2 is different from the first width w1; the third width w3 is different from the first width w1; and the third width w3 is different from the second width w2.

In this specific example, the mutually adjacent ridge portion 12c and ridge portion 12d have the same width of the first width w1. In such a case, the value of twice the first width w1, i.e., the total of the widths of the two adjacent ridge portions 12 along the radial direction, is set to be not more than the predetermined length.

In such a case as well, a length for which two of the ridge portions 12 are substantially unidentifiable can be employed as the predetermined width based on the vision of the human viewer 100 and the distance between the human viewer 100 and the optical element 520. Thereby, each of the multiple ridge portions 12 is not recognized; and the fringe pattern due to the multiple ridge portions 12 is not perceived. Specifically, 0.43 mm can be employed as the predetermined width recited above.

Thus, the diffraction effects are suppressed by the total of two adjacent ridge portions 12 being not more than a predetermined length (e.g., 0.43 mm) even in the case where the widths of mutually adjacent ridge portions 12 of the multiple ridge portions 12 are the same. Thereby, the ridge portions 12 themselves substantially are not perceived while the fringe pattern due to the diffraction effects is suppressed. Thereby, the ease of viewing the HUD can be improved.

Of the multiple ridge portions 12 in this specific example, one of two ridge portions 12 on either adjacent side of one ridge portion 12 has a width along the radial direction from the center of the concentric circles toward the outside that is different from the width of the one ridge portion recited above; and the other of the two ridge portions recited above has a width along the radial direction substantially the same as the width of the one ridge portion recited above.

In other words, the widths of the three continuously arranged ridge portions 12 are not the same. However, if the widths of the three continuously arranged ridge portions 12 are the same, the diffraction effects can be suppressed by the total of the widths of the three continuously arranged ridge portions 12 being not more than a predetermined length (e.g., 0.43 mm); and the ease of viewing the HUD can be improved.

Thus, in the optical element according to this embodiment, the trench spacing (i.e., the widths of the ridge portions 12) of the Fresnel lens is set to have a multiply periodic spacing or a randomly periodic spacing instead of using uniformly-spaced trenches or trenches with uniform heights. Thereby, the diffraction due to the Fresnel lens can be suppressed by breaking the periodicity.

As an example of multiply periodic spacing, a Fresnel lens having, for example, a triple periodic spacing such as that recited above can be applied. In a Fresnel lens having a triple periodic spacing, the widths of the ridge portions 12 change from the first width w1 to the second width w2 to the third width w3, and then change repeatedly in this order. The order of the widths of the ridge portions 12 is arbitrary and may be the order of the third width w3 to the second width w2 to the first width w1. Any width selected from the first width w1, the second width w2, and the third width w3 may be applied to the widths of the ridge portions 12. Also, the widths of the ridge portions 12 may change, for example, at random.

Regarding the optical element according to this embodiment, the optical element 520 will now be described further. However, the description below also can be applied to the optical elements 520a to 520c and the optical element 530 recited above.

The optical element 520 may further include the transmissive reflective optical layer 15 provided on the first major surface 10a of the first optical sheet 10 and capable of reflecting and transmitting visible light. The transmittance of the transmissive reflective optical layer 15 with respect to visible light may be set to be not less than 70%. Thereby, in the case where the optical element 520 is used in a HUD, both the image presented from the image projection unit 115 and the scenery image of the external environment can be viewed in good states.

The optical element 520 may further include the first transparent layer 18a provided on the first major surface 10a side of the first optical sheet 10 and being transparent to visible light. For example, the first transparent layer 18a which functions as an adhesive layer may be provided on the side of the transmissive reflective optical layer 15 opposite to the first optical sheet 10.

The optical element 520 may further include the first high refractive index layer 16a provided on the first major surface 10a of the first optical sheet 10 and having a refractive index higher than that of the first optical sheet 10. Thereby, the first major surface 10a can reflect and transmit.

The optical element 520 may further include, in addition to the first optical sheet 10 and the first high refractive index layer 16a, the second transparent layer 18b (e.g., an optical film) provided on the first major surface 10a of the first optical sheet 10 and transparent to visible light. The second transparent layer 18b may, for example, protect the first high refractive index layer 16a and increase the reliability of the optical element 514.

The optical element 520 may further include: the second optical sheet 20 including the second Fresnel lens 20f provided in the third major surface 20a opposing the first major surface 10a; and the second high refractive index layer 16b provided between the first optical sheet 10 and the second optical sheet 20 and having a refractive index higher than the refractive index of the first optical sheet 10.

The multiple ridge portions 12 of the first Fresnel lens 10f oppose the multiple groove portions 22 of the second Fresnel lens 20f respectively.

For example, as described above, the first Fresnel lens 10f includes the multiple ridge portions 12 having concentric circular configurations centered on the optical axis 13oa of the first Fresnel lens 10f; and the second Fresnel lens 20f includes the multiple groove portions 22 having concentric circular configurations centered on the optical axis 23oa of the second Fresnel lens 20f. The width of the ridge portion 12 positioned a distance (the first distance) along the radial direction from the optical axis 13oa of the first Fresnel lens 10f toward the outside of the concentric circles is substantially the same as the width of the groove portion 22 positioned the first distance recited above along the radial direction from the optical axis 23oa of the second Fresnel lens 20f toward the outside of the concentric circles.

The curvature of the groove portion 22 can be set to be substantially equal to the curvature of the ridge portion 12.

Thereby, the shift of the optical path when light passes through the ridge portion 12 can be corrected by the second optical sheet 20; the distortion of the image of the scenery of the external environment can be suppressed; and the ease of viewing the HUD can be improved further.

In the optical element 520, the optical axis 13oa of the first Fresnel lens 10f at the first major surface 10a may be disposed at a position different from the position of the center (the outline center 13s) of the outline of the first major surface 10a. Thereby, the effects according to the first embodiment can be realized further.

Third Embodiment

An example of a display apparatus according to a third embodiment of the invention will now be described.

Figure 12:
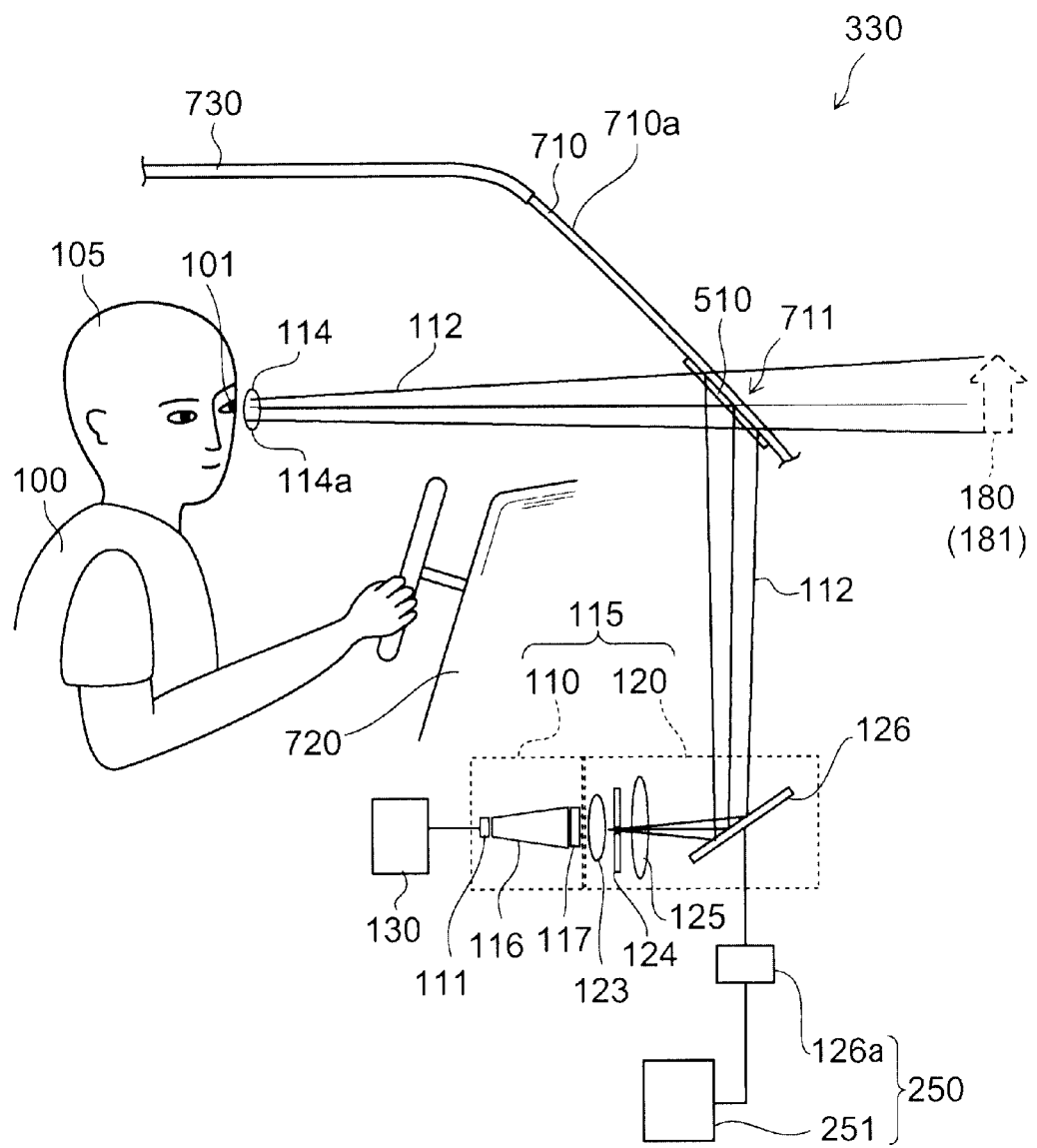
FIG. 12 is a schematic view illustrating the configuration of a display apparatus according to a third embodiment.

FIG. 12 is a schematic view illustrating the configuration of the display apparatus according to the third embodiment of the invention.

As illustrated in FIG. 12, the display apparatus 330 includes the image projection unit 115 that projects a light flux including an image toward the human viewer 100 by using the optical element 510 according to this embodiment of the invention to reflect the light flux. The display apparatus 330 may further include the optical element 510.

As illustrated in FIG. 12, while the display apparatus 330 may further include the image data generation unit 130, the image data generation unit 130 may be omitted in some cases. It is not always necessary to provide the image data generation unit 130 integrally with the image projection unit 115; and the image data generation unit 130 may be disposed, for example, not in the interior of the dashboard 720 but at any location of the vehicle 730. The image data from the image data generation unit 130 may be supplied to the image projection unit 115 using a wired or wireless method of electrical signals, optical signals, and the like.

In this specific example, the image projection unit 115 includes an image light formation unit 110 and a light flux projection unit 120.

The image light formation unit 110 includes, for example, a light source 111 and an image formation unit 117.

The light source 111 emits the light from which the light flux 112 is formed. The light source 111 may include various components such as LEDs (Light Emitting Diodes), high pressure mercury lamps, halogen lamps, lasers, etc.

The image formation unit 117 may include, for example, an optical switch such as a liquid crystal display apparatus (LCD) and the like. The image data from the image data generation unit 130 is supplied to the image formation unit 117; and the image formation unit 117 generates the light flux 112 including the image based on the image data.

In this specific example, the image light formation unit 110 further includes a tapered light guide 116 provided between the light source 111 and the image formation unit 117. The light emitted from the light source 111 is controlled by the tapered light guide 116 to have a divergence angle somewhat within a range. By passing through the image formation unit 117, the light becomes the light flux 112 including the image; and the divergence angle of the light flux 112 is controlled to be somewhat within a range.

The light flux projection unit 120 projects the light flux 112 emitted from the image light formation unit 110 toward the human viewer 100 by using the optical element according to this embodiment included in the windshield unit 710 of the vehicle 730 to reflect the light flux 112. Although the optical element 510 is used in this specific example, any of the optical elements according to the embodiments of the invention and optical elements of modifications thereof may be used as the optical element. The light flux projection unit 120 may include, for example, various lenses, mirrors, and various optical elements that control the divergence angle (the diffusion angle).

In this specific example, the light flux projection unit 120 includes a light source side lens 123, an aperture 124, an emerging side lens 125, and an emerging side mirror 126.

Along the travel direction of the light flux 112, the light source side lens 123 is disposed between the image light formation unit 110 and the emerging side mirror 126; the aperture 124 is disposed between the light source side lens 123 and the emerging side mirror 126; and the emerging side lens 125 is disposed between the aperture 124 and the emerging side mirror 126.

In this specific example, the emerging side mirror 126 may include a plane mirror. In other words, because the optical element 510 according to this embodiment provides the effect of enlarging the image, a plane mirror can be used as the emerging side mirror 126; and the light flux projection unit 120 (i.e., the image projection unit 115) can be downsized.

The divergence angle of the light flux 112 is controlled; and a design is possible in which the light flux 112 is incident on the eye 101 of the human viewer 100. Thereby, for example, the human viewer 100 can view the image included in the light flux 112 using one eye 101. Thereby, the difficulty of viewing due to the binocular parallax occurring when the image 181 of the display content 180 reflected by the windshield unit 710 is viewed with both eyes can be eliminated.

The windshield unit 710 may be disposed at a position such that the distance from the human viewer 100 is not less than 21.7 cm. Thereby, the sense of depth perceived by the human viewer 100 is increased; and it is easy for the display content 180 to be perceived at the desired depthward position.

However, the embodiments of the invention are not limited thereto. In some cases, the light flux 112 emitted from the image projection unit 115 may be incident on both eyes of the human viewer 100.

The light flux 112 can be appropriately projected toward the eye 101 of the human viewer 100 by using a movable emerging side mirror 126 and, for example, by manually or automatically adjusting the position and angle of the emerging side mirror 126 to match the position and movement of the head 105 of the human viewer 100.

By such a configuration, the divergence angle of the light flux 112 can be controlled; and a projection region 114 of the light flux 112 can be controlled in a constant range at the position of the human viewer 100.

Because the spacing between the eyes (the pupils) of the human viewer 100 is, for example, 60 millimeters (mm) to 75 mm, the size (the width in the left and right direction) of the projection region 114 of the light flux 112 at the position of the human viewer 100 may be set to be, for example, not more than about 60 mm to 75 mm in the case where the viewing is performed with one eye 101. The size of the projection region 114 may be controlled mainly by the optical element included in the light flux projection unit 120.

A projection position 114a of the light flux 112 at the position of the human viewer 100 can be controlled, for example, by changing the placement position and the angle of the image projection unit 115. For example, the projection position 114a can be controlled by changing at least one selected from the placement position of the image light formation unit 110, the angle of the image light formation unit 110, the placement position of the light flux projection unit 120, and the angle of the light flux projection unit 120.

For example, the display apparatus 330 may further include a control unit 250 that controls the projection position 114a of the light flux 112 at the position of the human viewer 100 by controlling the image projection unit 115. The projection position 114a may be controlled by the control unit 250 by, for example, controlling the angle of the emerging side mirror 126.

For example, the control unit 250 includes a control signal unit 251 and a drive unit 126a. The control signal unit 251 outputs a control signal to the drive unit 126a to operate the drive unit 126a. The drive unit 126a includes a motor and the like that changes, for example, the angle, position, etc., of the emerging side mirror 126. The drive unit 126a is operated by the control signal output from the control signal unit 251, changes the angle, position, etc., of the emerging side mirror 126, and changes the projection position 114a of the light flux 112 at the position of the human viewer 100. The drive unit 126a may be considered to be included in the image projection unit 115.

Various modifications of the configuration of each of the image light formation unit 110 and the light flux projection unit 120 are possible. The dispositions of the components included in the image light formation unit 110 and the components included in the light flux projection unit 120 are arbitrary. For example, the image light formation unit 110 (and the components included therein) may be inserted between the components included in the light flux projection unit 120.

Various modifications to the image projection unit 115 are possible in addition to the specific examples recited above.

Fourth Embodiment

A display method according to a fourth embodiment of the invention is a display method using the optical element described in regard to the first embodiment.

The display method includes: causing the light flux 112 including the image to be incident on the first optical sheet 10 from the second major surface 10b side, where the first optical sheet 10 includes the first Fresnel lens 10f provided in the first major surface 10a, and the second major surface 10b is on the side opposite to the first major surface 10a; changing the direction of the second major surface reflection light flux (the second reflected light Lout2) of the light flux 112 reflected by the second major surface 10b to be not less than 5 degrees from the direction of the first major surface reflection light flux (the first reflected light Lout1) of the light flux 112 reflected by the first major surface 10a; and projecting the first major surface light flux toward the human viewer 100.

In other words, the second reflection angle θout2 of the second reflected light Lout2 is changed to be not less than 5 degrees from the first reflection angle θout1 of the first reflected light Lout1; and the first reflected light Lout1 is projected toward the human viewer 100. Thereby, a double image can be suppressed; and an easily-viewable display can be realized.

Fifth Embodiment

A moving body according to a fifth embodiment of the invention (e.g., the vehicle 730) includes any of the optical elements according to the embodiments of the invention as illustrated in FIGS. 1A and 1B and a transparent plate (the windshield 710a and the windshield unit 710) supporting the optical element. The moving body may further include a display apparatus including the image projection unit 115 that projects the light flux 112 including an image toward the human viewer 100 by using the optical element according to this embodiment to reflect the light flux 112. The image projection unit 115 can control the divergence angle of the light flux including the image and project the light flux toward the optical element.

The moving body according to this embodiment may be any means of transportation such as a vehicle, ship, aircraft, etc.

Although any optical element according to this embodiment may be adhered to the windshield unit 710 of the moving body, the optical element may be built into the windshield unit 710. Such examples will now be described.

Figure 13A:
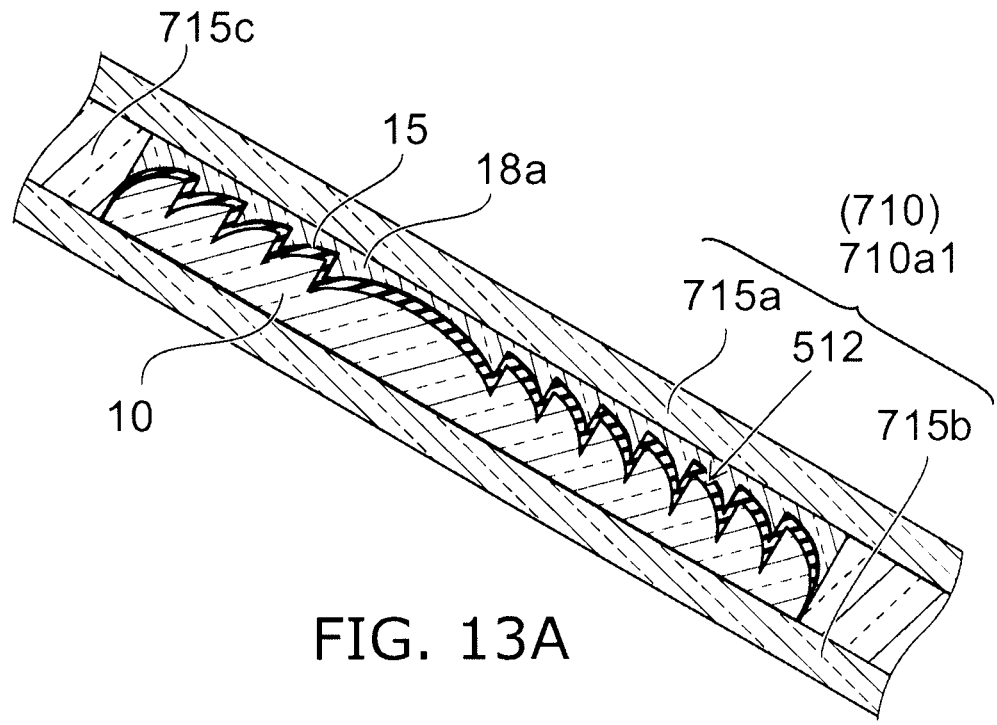
FIGS. 13A and 13B are schematic cross-sectional views illustrating configurations of portions of moving bodies according to a fifth embodiment.
Figure 13B:
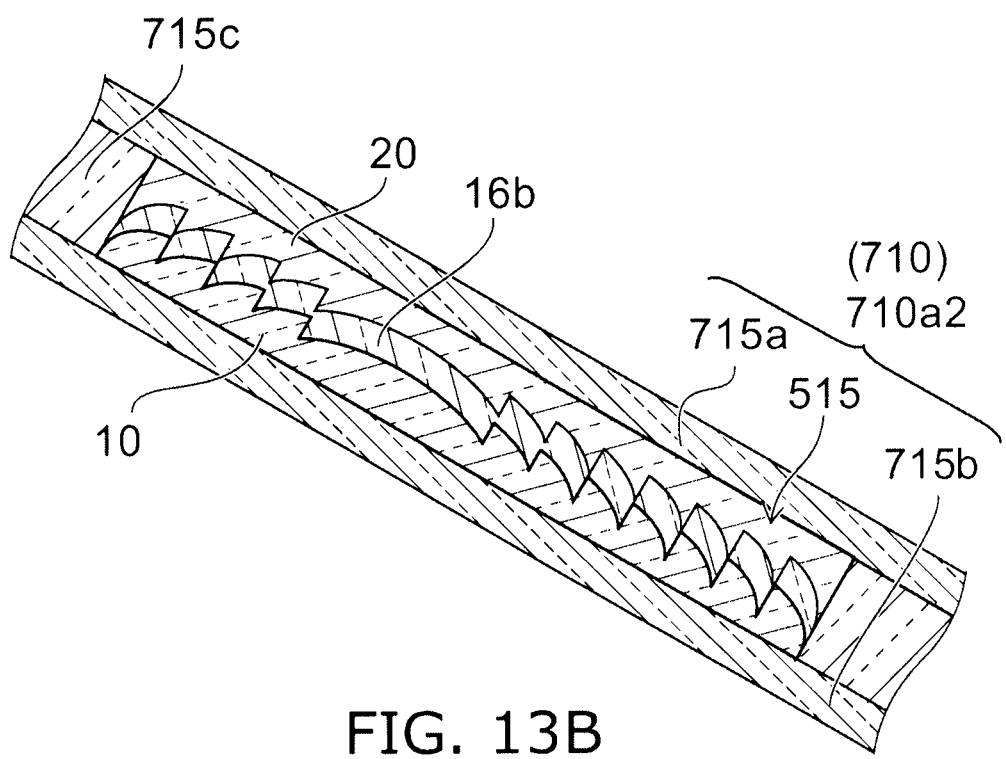

FIGS. 13A and 13B are schematic cross-sectional views illustrating configurations of portions of moving bodies according to the fifth embodiment of the invention.

As illustrated in FIG. 13A, a windshield 710a1 of the moving body according to this embodiment includes a first transparent plate 715a, a second transparent plate 715b, and an optical element provided between the first transparent plate 715a and the second transparent plate 715b. In this example, the optical element 512 described above is used as the optical element. A transparent resin layer 715c is provided in the portion between the first transparent plate 715a and the second transparent plate 715b where the optical element 512 is not provided. The material of the transparent resin layer 715c may be, for example, the same as the material of the first transparent layer 18a.

As illustrated in FIG. 13B, the optical element 515 described above is provided between the first transparent plate 715a and the second transparent plate 715b of the windshield 710a1 of the moving body according to this embodiment. The transparent resin layer 715c is provided in the portion between the first transparent plate 715a and the second transparent plate 715b where the optical element 512 is not provided.

The first transparent plate 715a and the second transparent plate 715b may include transparent substrates made of, for example, glass substrates or a resin.

By building the optical element into the windshield in the windshields 710a1 and 710a2 having such configurations, better convenience is provided to the user; and the reliability of the optical element increases because the first transparent plate 715a, the second transparent plate 715b, and the transparent resin layer 715c provide a seal around the optical element.

Any of the optical elements according to the embodiments of the invention can be provided between the first transparent plate 715a and the second transparent plate 715b.

Hereinabove, exemplary embodiments of the invention are described with reference to specific examples. However, the invention is not limited to these specific examples. For example, one skilled in the art may similarly practice the invention by appropriate selections from known art, including various modifications made by one skilled in the art in regard to configurations, sizes, material qualities, arrangements, and the like of specific configurations of components such as Fresnel lenses, optical sheets, transmissive reflective optical layers, high refractive index layers, and transparent layers included in optical elements, image projection units included in display apparatuses, optical components included in image projection units, and the like. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all optical elements, display apparatuses, display methods, and moving bodies practicable by an appropriate design modification by one skilled in the art based on the optical elements, the display apparatuses, the display methods, and the moving bodies described above as embodiments of the invention also are within the scope of the invention to the extent that the purport of the invention is included.

Furthermore, various modifications and alterations within the spirit of the invention will be readily apparent to those skilled in the art. All such modifications and alterations should therefore be seen as within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

The invention claimed is:
1. An optical element, comprising:
a first optical sheet having a first major surface, the first optical sheet including a first Fresnel lens provided in the first major surface, the first Fresnel lens including a plurality of ridge portions having concentric circular configurations, widths of mutually adjacent ridge portions of the plurality of ridge portions along a radial direction from a center of the concentric circles toward the outside being different from each other,
the width along the radial direction of each of the plurality of ridge portions being not more than 0.43 millimeters,
wherein a difference of the widths of the mutually adjacent ridge portions of the plurality of ridge portions is not less than 0.050 millimeters,
the plurality of ridge portions includes:
a first ridge portion having a first width along the radial direction;
a second ridge portion adjacent to the first ridge portion and provided outside the first ridge portion, the second ridge portion having a second width along the radial direction, the second width being larger than the first width; and
a third ridge portion adjacent to the second ridge portion and provided outside the second ridge portion, the third ridge portion having a third width along the radial direction, the third width being smaller than the first width, the first to third ridge portions are provided repeatedly.

* * * * *